United States Patent
Luethi et al.

[15] 3,661,606
[45] *May 9, 1972

[54] PROCESS FOR PROTECTING ORGANIC MATERIAL FROM THE ACTION OF ULTRAVIOLET RAYS

[72] Inventors: Christian Luethi, Munichstein; Max Duennenberger, Frenkendorf; Hans Rudolf Biland, Basel, all of Switzerland

[73] Assignee: Ciba-Geigy AG, Basel, Switzerland

[ * ] Notice: The portion of the term of this patent subsequent to Sept. 22, 1987, has been disclaimed.

[22] Filed: Apr. 13, 1970

[21] Appl. No.: 28,026

[30] Foreign Application Priority Data

Feb. 7, 1966  Switzerland ............................ 1679/66
Feb. 7, 1966  Switzerland ............................ 1680/66

[52] U.S. Cl. ............................ 106/178, 96/109, 106/124, 106/125, 106/138, 106/181, 106/186, 106/210, 106/218, 117/138.5, 252/300, 260/2.5 R, 260/2.5 BB

[51] Int. Cl. ................. C08b 27/68, C08f 45/60, C08g 51/60

[58] Field of Search ................ 106/186, 178, 181; 260/45.9, 260/45.85, 864

[56] References Cited

UNITED STATES PATENTS

| | | | |
|---|---|---|---|
| 3,211,562 | 10/1965 | Biland et al. | 260/45.9 |
| 3,529,982 | 9/1970 | Luethi et al. | 260/45.9 |
| 3,542,573 | 11/1970 | Biland et al. | 260/45.9 |

*Primary Examiner*—Donald E. Czaja
*Assistant Examiner*—V. P. Hoke
*Attorney*—Harry Goldsmith, Joseph G. Kolodny and Mario A. Monaco

[57] ABSTRACT

This invention refers to a process for protecting organic materials that can be damaged by ultraviolet rays, from the action of ultraviolet rays, wherein asymmetrical oxalic acid diarylamides of the general formula A—NH—CO—CO—NH—B where A and B are different from each other and each represents a benzene or naphthalene residue, these residues A and B (a) being free from hydroxyl groups in the ortho-positions to the amide nitrogen atom and (b) containing if desired substituents that contain no more than 20 carbon atoms and do not displace the absorption maximum of the compound towards values above 400 m$\mu$, are applied to said materials, as well as compositions containing said oxalic acid diarylamides.

9 Claims, No Drawings

PROCESS FOR PROTECTING ORGANIC MATERIAL FROM THE ACTION OF ULTRAVIOLET RAYS

This application is a continuation-in-part of application Ser. No. 614,039 filed Feb. 6, 1967 now U.S. Pat. No. 3,529,982, issued Sept. 22, 1970.

The present invention relates to the stabilization, with the aid of asymmetrical oxalic acid diarylamides, of organic materials that are sensitive to the action of ultra-violet rays against the influence of such rays.

It has already been described that oxalic acid bis-hydroxyarylamides are suitable for use as ultraviolet absorbers, but in the past it had been held that the light stability of such compounds depends on the presence of two free hydroxyl groups in ortho-position relatively to the amide nitrogen atom. In contradistinction to this assumption it has now been found that a large class of oxalic acid diarylamides that do not satisfy the requirement referred to are not only excellent ultraviolet absorbers suitable for industrial use but surprisingly even display a greater stability to light.

Accordingly, the present invention provides a process for protecting organic material that can be damaged by the action of light — preferably non-textile organic materials — from the action of light and especially ultraviolet rays, characterized in that asymmetrical oxalic acid diarylamides of the formula

are used, in which formula A and B are different from each other and each represents a benzene or naphthalene residue, these residues A and B a. being free from hydroxyl groups in the ortho-positions relatively to the amide nitrogen atom and b. possibly containing further substituents that contain at most 20 carbon atoms and do not displace the absorption maximum of the compound towards values above $400m\mu$; these arylamides are homogeneously distributed in the organic material to be protected or applied to the surface of said material or the material to be protected is coated with a filter layer that contains the compounds described. These new compounds are particularly valuable for protecting polycondensates, polyadducts and polyvinylchloride from the action of ultraviolet rays.

Depending on the practical importance for certain types of substrates, on the chemical relationship on the other hand or finally on the novelty of the substances these compounds may be classified according to different standpoints or subdivided into subgroups.

A group that is important from the standpoint of application comprises asymmetrical compounds of the general formula

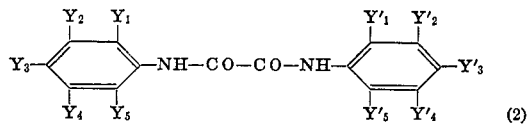

in which $Y_1$ and $Y_5$ as well as $Y_1'$ and $Y_5'$ each stands for a hydrogen or halogen atom, or a substituent with up to 20 carbon atoms from the series alkyl, substituted alkyl, benzene radical, benzyl group, a group $-CO-NHE_1$ or $-SO_2-NH-E_1$ (where $E_1$ is hydrogen, alkyl or aryl), a group $-COOE_2$ or $-SO_3E_2$ (where $E_2$ is hydrogen, alkyl, aryl or a salt-forming cation), a nitro group, a primary, secondary or tertiary amino group or an acyl-amino group, and $Y_2$, $Y_3$ and $Y_4$ as well as $Y_2'$, $Y_3'$ and $Y_4'$ each represents the same kind of group as $Y_1$ and $Y_5$ or $Y_1'$ and $Y_5'$ or a hydroxyl group, and a. each benzene nucleus contains at most two substituents $-CO-NH-E_1$, $-SO_2-NH-E_1$, $-COOE_2$, $-SO_3E_2$ or hydroxyl, b. each benzene nucleus contains at most three of the other substituents different from hydrogen, and c. the substituents in the two benzene nuclei differ from each other in at least one point as to type, number or positions.

Within the scope of the above definition halogen is, for example, chlorine or bromine; an alkyl is either one having a low number of carbon atoms ($C_1$ to $C_4$) and being branched or linear, or a higher alkyl group with five to 18 carbon atoms (for example octyl, dodecyl and the like). A substituted alkyl group is chloralkyl, bromalkyl, hydroxyalkyl, alkoxyalkyl, carboxy-alkyl or carbalkoxyalkyl. Acylamino groups are acetylamino or benzeylamino, and amino groups are above all methylamino and othylamino and anilino groups.

Of value within the scope of formula (1) are also those asymmetrical compounds which correspond to the formula

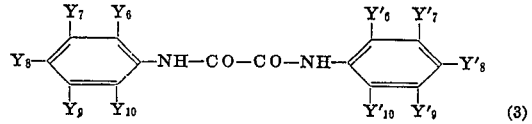

in which $Y_6$ and $Y_{10}$, and $Y_6'$ and $Y_{10}'$, are identical or different and each represents a hydrogen or halogen atom, an alkyl group with one to 12 carbon atoms or a phenyl group, and $Y_7$ to $Y_9$, as well as $Y_7'$ to $Y_9'$, represent the same groups as $Y_6$ and $Y_{10}$, or $Y_6'$ and $Y_{10}'$ respectively, or represent a hydroxyl group and a. each benzene nucleus contains at most two hydroxyl groups, b. each benzene nucleus contains at most three of the other substituents different from hydrogen, and c. the substituents in the two benzene nuclei differ in at least one point as to kind, number or positions.

According to one variant there are used compounds of the formula

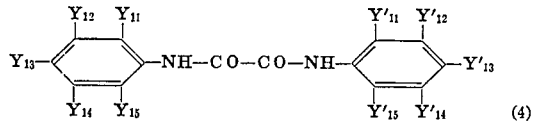

in which $Y_{11}$ to $Y_{15}$ and $Y_{11}'$ to $Y_{15}'$, are identical or different and each represents a hydrogen atom, a group $-CO-NH-E_1$ or $-SO_2-NH-E_1$ (where $E_1$ is hydrogen, alkyl with one to four carbon atoms or phenyl), a group $-COOE_2$ or $-SO_3E_2$ (where $E_2$ is hydrogen, alkyl with one to four carbon atoms, phenyl, an alkali salt ion, ammonium salt ion or amine salt ion) and each benzene nucleus contains at most 1 or 2 of the indicated substituents different from hydrogen, and also in this case the substituents in the two benzenenuclei differing from each other in at least one point as to type, number or positions.

Of special practical value within the scope of the formula (1) are those compounds which correspond to the following group formulae:

a. Compounds of the formula

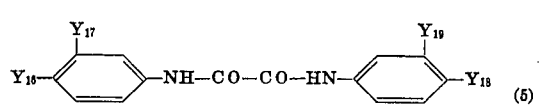

where $Y_{16}$ is a hydrogen or halogen atom or an alkyl group with one to four carbon atoms; $Y_{17}$ represents hydrogen or an alkyl group with one to four carbon atoms; $Y_{18}$ stands for hydrogen, halogen, an alkyl group with one to 18 carbon atoms which may be substituted by hydroxyl groups, halogen atoms or carboxyl groups, for a nitro group, an amino group, an acylamino group or a carboxylic acid group or its functional derivatives (carboxylic acid amide, carboxylic acid oster, carboxylic acid halide), and $Y_{19}$ represents a hydrogen or halogen atom, and where at least one substituent Y is different from hydrogen.

b. Compounds of the formula

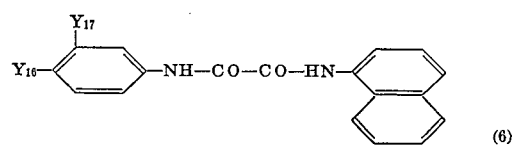

where $Y_{16}$ stands for a hydrogen or halogen atom or an alkyl group with one to four carbon atoms, and $Y_{17}$ for hydrogen or an alkyl group with one to four carbon atoms.

c. Compounds of the formula

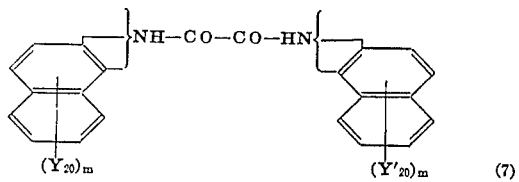

in which the brackets indicate that both α-naphthylamine and β-naphthylamine derivatives are possible. Compounds of this formula (7) must likewise be free from hydroxyl groups in ortho-position relatively to the amide nitrogen atom; in this formula $Y_{20}$ and $Y_{20}'$ respectively stands for a hydrogen atom, lower alkyl group with one to four carbon atoms, a sulphonic acid group or a possibly etherified hydroxyl group ($C_1$ to $C_6$ ethers), and, in the case of the sulphonic acid group, $m = 1$ or 2, and otherwise $m = 1$. In this formula, too, it suffices for the substituents in the two aromatic rings to differ from each other in one point as to type, number or positions.

d. Compounds of the formula

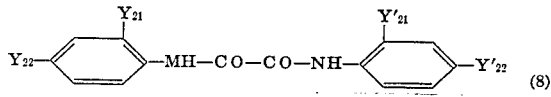

in which $Y_{21}$ and $Y_{22}$, and $Y_{21}'$ and $Y_{22}'$ respectively, are identical or different substituents from the series chlorine, bromine, alkyl with one to four carbon atoms, a nitro group, or one of the two substituents $Y_{21}$, $Y_{22}$ or $Y_{21}'$, $Y_{22}'$, stands for a hydrogen atom, a carboxylic acid group, a carboxylic acid alkyl ester group with one to eight carbon atoms in the alkyl residue, a sulphonic acid group or a sulphonic acid amide group, or $Y_{22}$ or $Y_{22}'$ represents a hydroxyl group.

e. Compounds of the formula

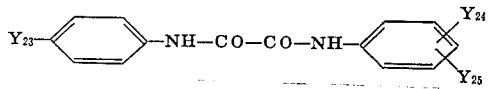

in which $Y_{23}$ represents hydrogen, an alkyl group with one to four carbon atoms or a fluorine, chlorine, or bromine atom, and $Y_{24}$ and $Y_{25}$ each stands for an alkyl group with one to four carbon atoms a chloralkyl or fluoralkyl group or a fluorine, chlorine or bromine atom.

f. Compounds of the formula

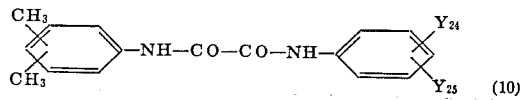

in which $Y_{24}$ and $Y_{25}$ have the above meanings and the methyl groups are preferably in positions 3 and 4.

g. Compounds of the formula

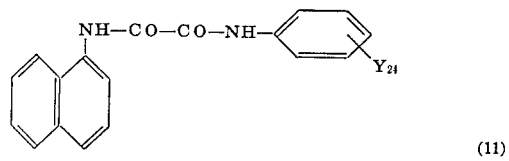

where $Y_{24}$ has the above meaning.

h. Compounds of the formula

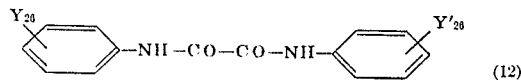

where $Y_{26}$ and $Y_{26}'$ differ from each other as to position and/or meaning and each represents a hydrogen or chlorine atom or a methyl group.

The oxalic acid bis-arylamides of the general formula (1) to be used in this invention are accessible by known methods. They are obtained when oxalic acid or an oxalic acid ester is semi-amidated in known manner in the first stage by reacting oxalic acid or an oxalic acid ester, especially an alkyl ester, with an approximately equimolecular quantity of a suitable primary amine A—$NH_2$ or B—$NH_2$ (where A and B have the above meanings). According to a preferred method, for example, oxalic acid, an oxalic acid semi-ester or oxalic acid diester containing identical or different ester residues, is condensed with approximately equimolecular quantities of one of the afore-mentioned amines in the melt or in an organic solvent that is inert towards the reactants, in the presence of anhydrous boric acid, at a temperature ranging from about 50° to 200° C.

The resulting amide-ester or amide-acid is isolated and then in a second stage the remaining carboxyl group or carboxylate group respectively of the oxalic acid semi-amide is condensed under analogous conditions with a second amine A—$NH_2$ or B—$NH_2$ (which is different from the amine used in the first stage), for which second condensation it is in general advantageous to use a temperature higher by about 50° to 100° C., that is to say a temperature from about 100° to 250° C. In this second condensation approximately equimolecular proportions are normally used as well.

Suitable inert organic solvents, as referred to above, are especially those which boil above about 160° C., for example higher benzene-hydrocarbons or halogenated benzenes such as dichlorobenzenes or trichlorobenzenes.

Alternatively, the second amide grouping may be introduced by semi-hydrolysis of the amide-ester obtained in the first stage to form the amide-acid which is converted into the amide-acid halide, and this is followed by amidation of the acid halide group.

In such primarily obtained oxalic acid diarylamides, which still contain free hydroxyl groups, these groups may or must be etherified or esterified in known manner to satisfy the above general formulae.

Within the scope of the requirements of formula (1) there may be used in the present process, for example, the following amines to form in each case one of the two amide groupings: Aniline, 2-, 3- and 4-chloraniline, 2,4- and 3,4-dichloraniline, 2,4,6-trichloraniline and the corresponding bromanilines, 2-, 3- and 4-fluoraniline, 2- and 4-iodaniline, 3,5-diiodaniline, 2-, 3- and 4-methylaniline, 2,4- and 2,5-dimethylaniline, 2,6-diethylaniline, 2-methyl-5-isopropylaniline, 2-, 3- and 4-methoxyaniline, 2,4- and 2,5-dimethoxyaniline, 2,5-diethoxyaniline, 4-butoxyaniline, 3-trifluoromethylaniline, 3,5-bis-trifluoromethylaniline, 2-, 3- and 4-nitraniline, 3- and 4-hydroxyaniline, 2-aminodiphenyl, meta- and para-aminoacetanilide, 3- and 4-aminobenzoic acids and their amides, anthranilic acid and its methyl and ethyl esters, para-amino-N,N-dimethylaniline, 4-amino-methylbenzoate and -ethylbenzoate, metanilic acid, sulphanilic acid, metanilamide, sulphanilamide, 4-hydroxy-3,5-di-tertiary butylaniline, 4-hydroxy-3,5-dichloraniline, 4,5-dichlorosulphanilic acid, 2-methoxy-5-methylaniline, 4-methyl-3-chloraniline, 2-chloro-4-trifluoromethylaniline, 2,4-dimethoxy-5-chloraniline and 2,4-dimethyl-6-nitraniline.

From among suitable naphthylamines there may be mentioned: α- and β-naphthylamine, sulphonic acids of the naphthylamines such as 1-napthylamine-4-, -5- and -8-sulphonic acid, 2-naphthylamine-1- and -5-sulphonic acid, 2-naphthylamine-4,8- and -6,8-disulphonic acid, 8-hydroxy-1-naphthylamine-4-sulphonic acid, 8-hydroxy-2-naphthylamine-6-sulphonic acid, 8-hydroxy-1-naphthylamine-4,6- and -3,6-disulphonic acid and 8-hydroxy-2-naphthylamine-3,6-disulphonic acid. Hydroxyamines in which a hydroxyl group in ortho-position to the amide nitrogen atom must subsequently be etherified: 2-hydroxyaniline, 2-hydroxy-4- and -5-phenylamine, 2-hydroxy-5-methylaniline, 2-hydroxy-5- chloraniline, 2-hydroxy-5-iso-octylaniline, 2-hydroxy-5-dodecylaniline, 2-hydroxy-4-methoxyaniline, 2,4-dihydroxyaniline, 1-hydroxy-2-naphthylamine and 2-hydroxy-1-naphthylamine.

Protection by stabilization can be given with the aid of the oxalic acid diamides described above, in principle, to all those organic materials that are in any form damaged or destroyed by the action of ultraviolet rays. Such damages by the action of the same agency, namely ultraviolet rays, may have very different effects, for example color shifts, changes in mechanical properties (brittleness, fissuring, tear strength, flexural strength, abrasion resistance, elasticity, ageing), triggering off of undesired chemical reactions (decomposition of delicate chemical substances, for example medicaments), photochemically induced rearrangements, oxidation and the like (for example of oils containing unsaturated fatty acids), causing of burns and irritations (for example on human skin) and the like. Of special importance is the use of the asymmetrical oxalic acid diarylamides defined above for protecting polycondensates and polyadducts from the action of ultraviolet rays.

The organic materials to be protected may be in widely differing processing stages and physical states, their common characteristic being their sensitivity towards ultraviolet rays.

As high-molecular and low-molecular substances that can be protected or stabilized by the present process there may be mentioned, for example, without any limitation thereto:
Organic natural substances such as are used for pharmaceutical purposes (medicaments), dyestuffs sensitive to ultraviolet rays, compound which as victuals or in victuals are decomposed by the action of light (unsaturated fatty acids in oils) and the like.

As examples of high-molecular organic substances there may be mentioned:

I. Synthetic organic materials of high or higher molecular weight such as:

a. Polymerization products based on organic compounds containing at least one polymerizable carbon-to-carbon double bond, that is to say their homopolymers or copolymers as well as their after-treating products, for example cross-linking, grafting or decomposition products; diluted polymers; modification products obtained by modifying reactive groupings in the polymer molecule and the like, for example polymers based on $\alpha,\beta$-unsaturated carboxylic acids (for example acrylates, acrylamides, acrylonitrile), of olefinic hydrocarbons, for example $\alpha$-olefines, ethylene, propylene or dienes, that is to say also rubbers and rubber-like polymers (also so-called ABS polymers), polymers based on vinyl and vinylidene compounds (for example styrene, vinyl esters, vinylchloride, vinyl alcohol), of halogenated hydrocarbons, of unsaturated aldehydes and ketones, allyl compounds and the like; other b. other polymerization products obtainable, for example, by ring opening, for instance polyamides of the polycaprolactam type, also formaldehyde polymers, or polymers accessible by polyaddition or polycondensation, such as polyethers, polythioethers, polyacetals, thioplasts;

c. polycondensation products or precondensates based on bifunctional or polyfunctional compounds containing condensable groups, their homocondensates and cocondensates as well as their after-treatment products, such, for example, as polyesters, [saturated (e.g., polyethylene terephthalate) or unsaturated (e.g., maleic acid-dialcohol polycondensates and their cross-linked products with copolymerizable vinyl monomers), linear or branched (also those based on polyhydric alcohols, e.g., alkyd resins)], polyamides (e.g., hexamethylenediamine adipate), maleinate resins, melamine resins, phenolic resins (e.g., novolaks), aniline resins, furan resins, carbamide resins and their precondensates and similarly constituted products; polycarbonates, silicone resins and the like;

d. polyadducts, such as polyurethanes (crosslinked and not crosslinked); epoxy resins.

II. Semisynthetic organic materials, for example, cellulose esters and mixed esters (cellulose acetate or propionate), nitrocellulose, cellulose ethers, regenerated cellulose (viscose rayon, cuprammonium cellulose) or their after-treatment products; casein synthetics.

III. Natural organic materials of animal or vegetable origin, for example those based on cellulose or proteins such as wool, cotton, silk, bast, jute, hemp, pelts and hairs, leathers, finely divided wood pulp, natural resins (such as colophony, especially lacquer resins), gelatin, glues, also rubber, gutta percha, balata and their after-treatment and modification products, degradation products, products accessible by modification of reactive groups.

The organic materials concerned, especially synthetic materials such as polymers of vinylchloride, saturated and unsaturated polyesters, celluloses and polyamides, may be at widely differing stages of their processing (raw materials, semi-finished products or finished products) and physical states. They may be in the form of products shaped in a wide variety of ways, that is to say, for example, as predominantly three-dimensional objects such as sections, vessels or components of a great variety, chips or granules, foamed products; predominantly two-dimensional materials such as films, foils, lacquers, impregnations or coatings, or predominantly unidimensional materials such as filaments, fibers, flocks, bristles or wires. The said materials may also be in unshaped states in a wide variety of homogeneous or inhomogeneous forms of distribution and physical states, for example in the form of powders, solutions, normal and reversed emulsions (creams), dispersions, latices, sols, gels, putties, waxes, adhesives or pore fillers, and the like.

Fibrous materials may be used in a wide variety of processing forms of non-textile materials, for example as threads, yarns, fiber fleeces, padding, felts, flocculated materials or as textile fabrics or textile laminates, knitwear, papers, cardboards and the like.

The new stabilizers may also be used, for example, as follows:

a. In cosmetics, such as perfumes, dyed or undyed soaps and bath salts, skin and face creams, powders, repellants and especially sunburn oils and creams;

b. in admixture with dyestuffs or pigments or as additives to dyebaths, printing, discharge or reserve pastes, also for after-treating dyeings, prints or discharge prints;

c. in admixture with so-called carriers, antioxidants, other light filters, heat stabilizers or chemical bleaches;

d. in admixture with crosslinking agents or dressing agents such as starch or synthetically produced dressings;

e. in combination with detergents (the detergents and stabilizers may, if desired, be added separately to the washing liquors);

f. in gelatin layers used in photography;

g. in combination with polymeric vehicles (products of polymerization, polycondensation or polyaddition) in which the stabilizers, if desired in addition to other substances, are incorporated in the dissolved or dispersed form, for example in coating, impregnating or binding agents (solutions, dispersions, emulsions) for textiles, fleeces, papers leathers;

h. as additives to a wide variety of industrial products to reduce the speed of their ageing, for example as additives to glues, adhesives, paints or the like.

If the protective compounds of this invention are to be used for the treatment of textile organic materials of natural or synthetic origin, for example textile fabrics, they may be applied to the substrate to be protected at any desired phase of the final processing of the latter, such as during a dressing or anticrease finishing or dyeing process or during any other finishing operation, by way of a fixing operation similar to a dyeing process.

Furthermore, the new stabilizers to be used according to this invention are preferably added to or incorporated with the materials prior to or during their shaping. Thus, for example, they may be added to the moulding or injection moulding compositions used in the manufacture of films, foils, tapes or mouldings, or they may be dissolved or dispersed or in any other way finely distributed in the spinning mass before it is spun. The protective compounds may also be added to the starting substances, reaction mixtures or intermediates used in the manufacture of fully synthetic or semisynthetic organic materials, that is to say also before or during the chemical reaction, for example in a polycondensation (including precondensates), in a polymerization (including prepolymers) or in a polyaddition.

An important sphere of application of the stabilizers to be used in the invention consists in incorporating these substances in a protective layer used to protect material placed underneath it. This application may take the form of applying the ultraviolet absorber to the surface layer (of a film or of a fiber or of a multidimensional shaped object). This can be done for example similar to a dyeing process, or the active substance may be embedded in a polymer (polycondensate or polyadduct) film by one of the known surface coating methods with polymeric substances, or the active substance may be dissolved in a suitable solvent and caused to diffuse or swell into the surface layer. According to another important variant the ultra-violet absorber is embedded in a self-supporting, substantially two-dimensional carrier material, for example a foil or the wall of a vessel, in order to keep ultraviolet rays away from the substance located behind it (relevant examples: shop windows, films, transparent packages, bottles).

From the foregoing it is self-evident that in addition to the protection of the substrate or carrier material containing the ultraviolet absorber also other substances contained in the substrate are protected, for example dyestuffs, antioxidants, disinfectants, antistatics and other dressing agents, plasticizers and fillers.

Depending on the type of substance to be protected or stabilized, on its sensitivity or on the form in which the protection and stabilization is to be imparted, the requisite amount of stabilizer may vary within wide limits, for example from about 0.01 to 10 percent by weight, referred to the amount of substrate to be protected. For most practical purposes, however, a quantity from about 0.05 to 2 percent will suffice.

Accordingly, as results from the foregoing, the process for protecting organic materials from the effects of ultraviolet radiation and heat consists in homogeneously distributing the oxalic acid diamides described in the organic material to be protected, or applying it to the surface of said material or coating the material to be protected with a filter layer containing one of the compounds mentioned.

In particular, this is advantageously done by homogeneously incorporating the oxalic acid diarylamides described in substance or in the dissolved or dispersed form in an amount of 0.1 to 10 percent, preferably 0.2 to 2.0 percent by weight (referred to the weight of the material to be protected) in the organic material to be protected before the latter undergoes its final shaping.

If the substance to be used according to this invention is to be applied to the surface of the substrate to be protected, thus for instance a fibrous material (fabric), this is advantageously done by immersing the substrate to be protected in a liquor in which the ultraviolet absorber is dissolved or dispersed. Suitable relevant solvents are, for example, methanol, ethanol, acetone, ethyl acetate, methylethylketone, cyclohexanol and above all water. The substrate to be treated is left in the liquor for some time, similar to the way that dyeing processes are carried out; as a rule, 10 minutes to 24 hours at 10° to 120° C. suffice, during which, if desired, the liquor may be agitated. Finally, the material is rinsed, if necessary washed, and dried.

In many cases it is advantageous to use the light filters described above in combination with sterically hindered phenols, esters of thiodipropionic acid or organic phosphorus compounds.

Unless otherwise indicated, parts and percentages in the following Manufacturing Instructions and Examples are by weight.

Manufacturing Instruction A 1

A mixture of 9.1 parts of the compound of the formula

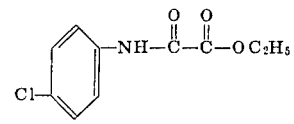

(13)

6.5 parts of 3,4-dichloraniline and 0.5 part of boric acid is stirred for 2 hours at 175° to 180° C., while continuously distilling off the alcohol formed. The melt is then dissolved in dimethylformamide and at 20° C. water is added to the solution.

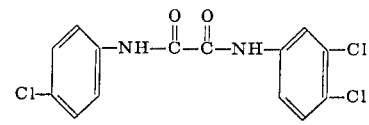

(14)

settles out in the form of almost colorless crystals. Yield: about 12 parts.

An analytically pure product obtained by 3 recrystallizations from benzene+methanol melts at 234° to 235° C. and reveals the following data:

| $C_{14}H_9O_2N_2CH_3$ | calculated | C 48.94 | H 2.64 | N 8.15% |
|---|---|---|---|---|
| | found | 49.09 | 2.48 | 8.17 |
| | | % | | |

In a similar or different manner the compounds listed in the following Table were obtained. In this Table

| Column I | = formula No. |
|---|---|
| columns II+III | = definition of the compound |
| column IV | = melting point in °C (uncorrected) |
| column V | = analytical data C H N |
| | 1st line: calculated |
| | 2nd line: found |

Concerning compound No. 24 in Table $D_1$ it should be stated that the $C_{12}H_{25}$-residue is a mixture of different branched isomers (from a tetramerization of 4 propylene molecules).

(15)

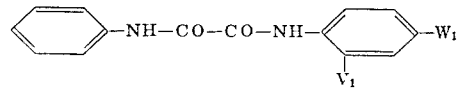

| I | II ($V_1=$) | III ($W_1=$) | IV | V | | |
|---|---|---|---|---|---|---|
| 16 | —H | —NO₂ | 252–253 | 58.94 | 3.89 | 14.73 |
| | | | | 59.20 | 4.00 | 14.60 |
| 17 | —H | —NH₂ | 211–212 | 65.87 | 5.13 | 16.46 |
| | | | | 65.86 | 5.05 | 16.32 |
| 18 | —H | —NH—CO—CH₃ | 295–297 | 64.03 | 5.09 | 14.14 |
| | | | | 64.48 | 4.94 | 14.16 |
| 19 | —H | —COOH | >330 | 63.38 | 4.26 | 9.86 |
| | | | | 63.66 | 4.39 | 10.01 |
| 20 | —H | —COCl | 229–231 | 59.51 | 3.66 | 9.25 |
| | | | | 59.85 | 3.70 | 9.22 |
| 21 | —H | —CONH₂ | >330 | 63.59 | 4.63 | 14.83 |
| | | | | 63.22 | 4.63 | 14.65 |

| I | II ($V_1=$) | III ($W_1=$) | IV | V | | |
|---|---|---|---|---|---|---|
| 22 | —H | —CO—NH—CH(CH₂CH₃)—(CH₂)₃—CH₃ | 267–269 | 69.85 / 69.87 | 7.39 / 7.28 | 10.63 / 10.72 |
| 23 | —H | COONa | >330 | 58.83 / 58.59 | 3.62 / 3.70 | 9.15 / 9.28 |
| 24 | —H | —COOC₂H₅ | 202–203 | 65.37 / 65.59 | 5.16 / 5.28 | 8.97 / 8.98 |
| 25 | —H | —C₁₂H₂₅ | 75–90 | 76.43 / 76.56 | 8.88 / 8.61 | 6.86 / 6.91 |
| 26 | —COO—C₆H₄—Cl | —H | 222–223 | 63.89 / 63.65 | 3.90 / 3.99 | 7.10 / 7.19 |
| 27 | —H | —CH₂CH₂—OH | 217–218 | 67.59 / 67.48 | 5.67 / 5.58 | 9.85 / 9.89 |
| 28 | —H | —CH₂COOH | 254–256 | 64.42 / 64.47 | 4.73 / 4.75 | 9.39 / 9.32 |
| 29 | —H | —CH₂CH₂CH₂CH₃ | 178–180 | 72.95 / 72.93 | 6.80 / 6.61 | 9.45 / 9.58 |

$$D_2$$
$$V_2-NH-CO-CO-NH-W_2$$

(30)

| I | II ($V_2=$) | III ($W_2=$) | IV | V | | |
|---|---|---|---|---|---|---|
| 31 | Cl—C₆H₄— | —C₆H₄—CH₃ | 271–272 | 62.40 / 62.30 | 4.54 / 4.51 | 9.70 / 9.59 |
| 32 | Same as above | 3,5-(CF₃)₂—C₆H₃— | 189–190 | 46.79 / 47.00 | 2.21 / 2.45 | 6.82 / 6.81 |
| 33 | Br—C₆H₄— | 2,4-Cl₂—C₆H₃— | 249–250 | 43.33 / 43.24 | 2.34 / 2.24 | 7.22 / 7.25 |
| 34 | Same as above | —C₆H₄—CH₃ | 289–290 | 54.00 / 54.13 | 3.91 / 3.92 | 8.42 / 8.45 |
| 35 | do | 3-CF₃-4-Cl—C₆H₃— | 203–204 | 42.73 / 42.53 | 2.15 / 2.40 | 6.64 / 6.61 |
| 36 | do | 3,5-(CF₃)₂—C₆H₃— | 209–210 | 42.22 / 42.12 | 1.99 / 1.82 | 6.15 / 6.36 |
| 37 | CH₃—C₆H₄— | 2,4-Cl₂—C₆H₃— | 227–228 | 55.75 / 56.04 | 3.74 / 3.49 | 8.76 / 8.86 |
| 38 | Same as above | 3-CF₃-4-Cl—C₆H₃— | 191–92 | 53.87 / 54.09 | 3.39 / 3.65 | 7.85 / 7.92 |
| 39 | do | 3,5-(CF₃)₂—C₆H₃— | 165–166 | 52.32 / 52.03 | 3.10 / 3.10 | 7.18 / 7.23 |

(40) $V_2-NH-CO-CO-NH-W_2$

| I | II ($V_2=$) | III ($W_2=$) | IV | V | | |
|---|---|---|---|---|---|---|
| 41 | 2,3-(CH₃)₂—C₆H₃— | 2,4-Cl₂—C₆H₃— | 225–226 | 56.99 / 57.71 | 4.18 / 4.25 | 8.31 / 8.43 |
| 42 | Same as above | —C₆H₄—CH₃ | 205–206 | 72.32 / 72.61 | 6.43 / 6.52 | 9.92 / 10.00 |

| I | II ($V_2=$) | III ($W_2=$) | IV | V | | |
|---|---|---|---|---|---|---|
| 43 | do | CF$_3$, Cl-phenyl | 183-184 | 55.07 / 55.17 | 3.81 / 3.97 | 7.56 / 7.56 |
| 44 | do | CF$_3$, CF$_3$-phenyl | 178-179 | 53.47 / 53.77 | 3.49 / 3.60 | 6.93 / 6.92 |
| 45 | naphthyl | CH$_3$, CH$_3$-phenyl | 207-208 | 75.45 / 75.16 | 5.70 / 5.65 | 8.80 / 8.83 |
| 46 | Same as above | -CH$_3$ phenyl | 182-183 | 74.98 / 74.71 | 5.30 / 5.24 | 9.21 / 9.24 |
| 47 | do | -Cl phenyl | 226-227 | 66.57 / 66.53 | 4.03 / 3.75 | 8.63 / 8.59 |
| 48 | do | -Br phenyl | 230-231 | 58.55 / 58.47 | 3.55 / 3.30 | 7.95 / 7.65 |
| 49 | O$_2$N-phenyl- | CF$_3$-phenyl | 200-201 | 51.00 / 51.18 | 2.85 / 2.79 | 11.90 / 12.00 |

(50)  $V_2-NH-CO-CO-NH-W_2$

| I | II ($V_2=$) | III ($W_2=$) | IV | V | | |
|---|---|---|---|---|---|---|
| 51 | Cl-phenyl- | CF$_3$, Cl-phenyl | 188-189 | 47.77 / 47.93 | 2.41 / 2.56 | 7.34 / 7.57 |
| 52 | phenyl- | CH$_3$, CH$_3$, CH$_3$-phenyl | 240-242 | 72.32 / 72.02 | 6.43 / 6.46 | 9.92 / 9.76 |
| 53 | N≡C-phenyl- | -Cl phenyl | >330 | 60.11 / 60.19 | 3.36 / 3.39 | 14.02 / 14.16 |
| 54 | H$_5$C$_2$O-phenyl- | -OH phenyl | 277-279 | 63.99 / 63.95 | 5.37 / 5.34 | 9.33 / 9.06 |
| 55 | phenyl-C(=O)-O-phenyl- | Same as above | 302-304 | 67.01 / 66.98 | 4.29 / 4.24 | 7.44 / 7.49 |

EXAMPLES OF USE

In the following examples of use there were used in each case typical representatives of every subgroup of compounds of this invention. In principle, all compounds mentioned in the foregoing description and their equivalents are equally suitable, except that it is only necessary to take into consideration the solubility of the compound concerned in the individual substrate, or to determine it by means of a small-scale test. Finally, it may also be necessary to bear in mind the fact that the absorption maximum of the compound to be incorporated is effected by the substituents in the aromatic residue.

EXAMPLE 1

An acetylcellulose film of about 50μ thickness is produced by pouring a 10 percent acetonic solution of acetylcellulose containing 1 percent (referred to the acetylcellulose) of the compound of the formula (51). After drying, the film reveals the following light transmission values in percent:

| Wavelength in mμ | Light transmission | in percent |
|---|---|---|
| 260 to 310 | unexposed | exposed for 100 hours in a |

| | | fadeometer |
|---|---|---|
| 320 | 0 | 0 |
| 330 | 5 | 5 |
| 330 | 20 | 20 |
| 340 | 50 | 50 |
| 350 | 75 | 75 |

An analogous behavior is observed, for example, with compounds (17), (27), (45), (47) and (53).

EXAMPLE 2

A paste from 100 parts of polyvinylchloride, 59 parts by volume of dioctylphthalate and 0.2 part of the compound of the formula (45) is rolled to and fro on a calender at 145° to 150° C. to form a foil about 0.5 mm. thick. The resulting polyvinylchloride foil absorbs in the ultraviolet region from 280 to 350 m$\mu$.

Instead of the compound (45) there may be used, for example, the compound (24), (29), (33), (37) or (41).

EXAMPLE 3

A mixture of 100 parts of polyethylene and 0.2 part of the compound of the formula (42) is rolled to and fro on a calender at 130° to 140° C. to form a foil which is then pressed at 150° C.

The polyethylene foil obtained in this manner is substantially impermeable to ultraviolet light within the range from 280 to 350m$\mu$.

Instead of the compound (42) there may be used, for example, the compound (12), (34), (46) or (47).

EXAMPLE 4

A mixture of 100 parts of polypropylene and 0.2 part of the compound of the formula (29), (32), (35), (45) or (51) is rolled to and fro on a calender at 170° C. to form a sheet which is then pressed at 230° to 240° C. under a maximum pressure of 40 kg./cm.$^2$ to form a panel 1mm. thick.

The panels obtained in this manner are substantially impermeable to ultraviolet light within the region from 280 to 350m$\mu$. Other compounds listed in the Table display a similar behaviour.

EXAMPLE 5

A solution of 0.2 part of the compound of the formula (14) in 1.8 parts of monostyrene is mixed with 0.2 part of a solution of cobalt naphthenate in monostyrene (containing 1 percent of cobalt). Then 40 parts of an unsaturate polyester resin based on phthalic acid/maleic acid/ethyleneglycol in monostyrene are added and the whole is stirred for 10 minutes. Then 1.7 parts of a catalyst solution (methylethylketone peroxide in dimethylphthalate) are dropped in and the well-stirred, air-free mass is poured in between two panes of glass. After 20 minutes the polyester panel of 1 mm. thickness has sufficiently solidified to be taken out of the mould. The panel is impermeable to ultraviolet light within the region from 280 to 350m$\mu$.

Instead of the compound (14) it is possible to use, for example, the compound of the formula (31) or (32).

EXAMPLE 6

25 Grams of distilled monostyrene are prepolymerized in a stoppered bottle in a heating cabinet for 2 days at 90° C., and then 0.25 g. of the compound of the formula (45), (46), (48) or (51) and 0.025 g. of benzoyl peroxide are slowly stirred in. The mixture is poured into a cubic mould of aluminum foil and heated for 1 day at 70° C. When the mass has completely cooled and solidified, the mould is broken apart. The resulting block is then pressed in a hydraulic press at a temperature of 138° C. under a pressure of 150 kg./cm.$^2$ to form a panel 1 mm. thick.

The polystyrene panels manufactured in this manner are impermeable to ultraviolet light within the region from 280 to 350m$\mu$; they are completely colorless. On exposure in a fadeometer a distinct improvement in the stability to light is observed since polystyrene panels that contain the above compounds of the above formulas do not show any sign of yellowing after 200 hours, while panels that do not contain them have already turned yellow. A similar behavior is displayed by other compounds listed in the Tables.

EXAMPLE 7

8 Grams of a mixture of toluylene-2,4-diisocyanate and toluylene-2,6-diisocyanate (65 : 35) and 20 g. of a slightly branched polyester from adipic acid, diethyleneglycol and triol (hydroxyl number: 60) are stirred together for about 15 seconds. Then 2 ml. of a catalyst mixture (consisting of 6 ml. of a tertiary amine, 3 ml. of a dispersant, 3 ml. of a stabilizer and 2 ml. of water) and 0.28 g. of the compound (32), (35), (45) or (51) are added and the whole is stirred for a short time. A foam fleece forms which is immersed in water after 30 minutes. After another 30 minutes it is thoroughly washed with water and dried at room temperature.

The addition of one of the afore-mentioned ultraviolet absorbers improves the stability during the exposure in the xeno test apparatus. The above absorbers also lend themselves well to incorporation with numerous other polyurethanes obtained by the isocyanate polyaddition process.

A similar behavior is observed also with other compounds listed in the Table.

EXAMPLE 8

0.2 Gram of the compound of the formula (14) is dissolved in 10 g. of pure olive oil. The compound dissolves rapidly and without heating. A 50$\mu$-thick layer of this solution absorbs ultraviolet light up to 340 m$\mu$.

In the same manner other fatty oils and creams, or emulsions used for cosmetic purposes may be used for dissolving the above compound and others, for example the compound (32), (39) or (51).

EXAMPLE 9

12 Grams of polyacrylonitrile are sprinkled with stirring into 88 g. of dimethylformamide until all has dissolved, and then 0.1 g. of the compound of, for example, formula (46) is added which dissolved immediately. The viscous mass is the applied to a cleaned pane of glass and spread out with a film drawing rod. The coated pane is then dried for 20 minutes in a vacuum drying cabinet at 120° C and under a vacuum of 150 mm. Hg. A foil about 0.05 mm. thick is obtained which is easy to detach from the glass support. The foil obtained in this manner is completely colorless and absorbs ultraviolet light up to a wavelength of 350m$\mu$ almost completely, while a foil not containing the absorber of the formula (46) passes at least 80 percent of the ultraviolet light. Incidentally, the compounds mentioned in connection with polystyrene are also suitable for incorporation with polyacrylonitrile.

What we claim is:

1. Process for protecting an organic material selected from the group of acetylcellulose, polyvinylchloride, synthetic polyamides, copolymers of unsaturated polyesters, polystyrene, polyethylene, polypropylene and polyurethanes from the action of ultraviolet rays, wherein an asymmetrical compounds is applied to the organic material, said compound corresponding to the formula

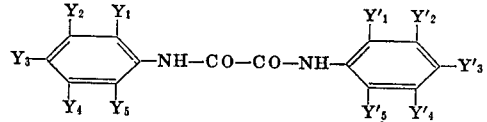

Wherein $Y_1$, $Y_5$, $Y_1'$ and $Y_5'$ each represents a member selected from the group consisting of hydrogen, halogen, a substituent containing up to 20 carbon atoms selected from the group consisting of alkyl, substituted alkyl, —CO—NH—$E_1$, wherein $E_1$ is hydrogen or alkyl, —COOE$_2$, where $E_2$ is hydrogen, a salt-forming cation or alkyl, and $Y_2$, $Y_3$, $Y_4$, $Y_2'$, $Y_3'$ and $Y_4'$ each represents the same group as $Y_1$, $Y_5$, $Y_1'$ and $Y_5'$ and $Y_1$ and $Y_2$ may form the complement to a fused-on unsubstituted benzene ring with the proviso that $Y_3$, $Y_4$ and $Y_5$ represent a hydrogen atom, and where (a) each benzene nucleus contains at most two residues selected from the group consisting of —CO—NH—$E_1$ and —COO$E_2$, and (b) each benzene nucleus contains at most three of the other substituents different from hydrogen, and the substituents in the two benzene nuclei differ from each other in at least one point insofar as kind, number or positions are concerned.

2. Process according to claim 1, wherein there are applied asymmetrical compounds of the formula

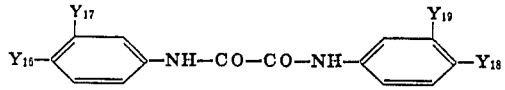

in which $Y_{16}$ represents a member selected from the group consisting of hydrogen, halogen and an alkyl group with one to four carbon atoms, $Y_{17}$ a hydrogen atom or an alkyl group with one to four carbon atoms, $Y_{18}$ a member selected from the group consisting of hydrogen, halogen, an alkyl group with up to 18 carbon atoms which may be substituted by hydroxyl groups or halogen atoms, a carboxylic acid group, a carboxylic acid amide or carboxylic acid ester, and $Y_{19}$ represents a hydrogen or halogen atom, with the proviso that at least one Y-substituent is different from hydrogen.

3. Process according to claim 1, wherein there are applied asymmetrical compounds of the formula

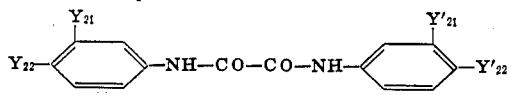

in which $Y_{21}$ and $Y_{22}$ and $Y_{21}'$ and $Y_{22}'$, respectively, represent a member selected from the group consisting of chlorine, bromine and an alkyl group with one to four carbon atoms, and one of the two substituents $Y_{21}$, $Y_{22}$ and $Y_{21}'$, $Y_{22}'$ represents a member selected from the group consisting of hydrogen, a carboxylic acid group and a carboxylic acid alkyl ester group with one to eight carbon atoms in the alkyl grouping.

4. Process according to claim 1, wherein there are applied compounds of the general formula

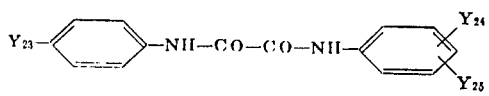

in which $Y_{23}$ represents a member selected from the group consisting of hydrogen, an alkyl group with one to four carbon atoms, fluorine, chlorine and bromine, and $Y_{24}$ and $Y_{25}$ each stands for a member selected from the group consisting of an alkyl group with one to four carbon atoms, a fluro-alkyl group, fluorine, chlorine and bromine.

5. Process according to claim 1, wherein there are applied compounds of the general formula

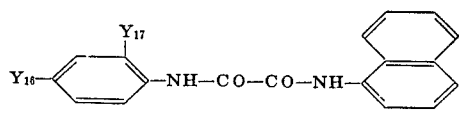

in which $Y_{16}$ represents a member selected from the group consisting of hydrogen, halogen and an alkyl group with one to four carbon atoms and $Y_{17}$ is hydrogen atom or an alkyl group with one to four carbon atoms.

6. Process according to claim 1 for protecting an organic material selected from the group consisting of acetylcellulose, polyvinylchloride, synthetic polyamides and copolymers of unsaturated polyesters from the action of ultraviolet rays, wherein an asymmetrical compound is applied to the organic material said compound corresponding to the formula

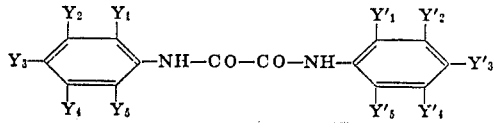

wherein $Y_1$, $Y_5$, $Y_1'$ and $Y_5'$ each represents a member selected from the group consisting of hydrogen, halogen, a substituent containing up to 20 carbon atoms selected from the group consisting of alkyl substituted alkyl, —CH—NH—$E_1$, wherein $E_1$ is hydrogen or alkyl, —COO$E_2$, where $E_2$ is hydrogen or alkyl, and $Y_2$, $Y_3$, $Y_4$, $Y_2'$, $Y_3'$ and $Y_4'$ each represents the same group as $Y_1$, $Y_5$, and $Y_1'$ and $Y_5'$, and where (a) each benzene nucleus contains at most two residues selected from the group consisting of —CO—NH—$E_1$ and —COO$E_2$, and (b) each benzene nucleus contains at most three of the other substituents different from hydrogen, and the substituents in the two benzene nuclei differ from each other in at least one point insofar as kind, member or position are concerned.

7. Process according to claim 6, wherein there are applied asymmetrical compounds of the formula

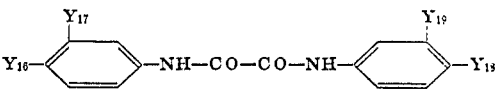

in which $Y_{16}$ represents a member selected from the group consisting of hydrogen, halogen and an alkyl group with one to four carbon atoms, $Y_{17}$ a hydrogen atom or an alkyl group with one to four carbon atoms, $Y_{18}$ a member selected from the group consisting of hydrogen, halogen, an alkyl group with up to 18 carbon atoms which may be substituted by hydroxyl groups or halogen atoms, a carboxylic acid group, a carboxylic acid amide or carboxylic acid ester, and $Y_{19}$ represents a hydrogen or halogen atom, with the proviso that at least one Y-substituent is different from hydrogen.

8. Process according to claim 6, wherein there are applied asymmetrical compounds of the formula

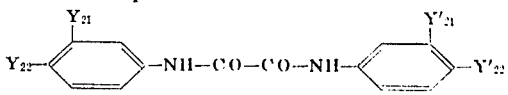

in which $Y_{21}$ and $Y_{22}$ and $Y_{21}'$ and $Y_{22}'$, respectively, represent a member selected from the group consisting of chlorine, bromine and an alkyl group with one to four carbon atoms, and one of the two substituents $Y_{21}$, $Y_{22}$ and $Y_{21}'$, $Y_{22}'$ represents a member selected from the group consisting of hydrogen, a carboxylic acid group and a carboxylic acid alkyl ester group with one to eight carbon atoms in the alkyl grouping.

9. Process according to claim 6, wherein there are applied compounds of the general formula

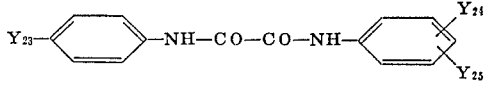

in which $Y_{23}$ represents a member selected from the group consisting of hydrogen, an alkyl group with one to four carbon atoms, fluorine, chlorine and bromine, and $Y_{24}$ and $Y_{25}$ each stands for a member selected from the group consisting of an alkyl group with one to four carbon atoms, a fluor alkyl group, fluorine, chlorine and bromine.

* * * * *